United States Patent
Jones, Jr. et al.

(10) Patent No.: US 12,488,315 B1
(45) Date of Patent: Dec. 2, 2025

(54) DAMAGE ASSESSMENT SYSTEMS AND METHODS

(71) Applicant: United Services Automobile Association (USAA), San Antonio, TX (US)

(72) Inventors: David M. Jones, Jr., San Antonio, TX (US); Joel S. Hartshorn, Port Orchard, WA (US); Nolan Serrao, Plano, TX (US); Jennifer Hunt Erickson, San Antonio, TX (US); Subhalakshmi Selvam, Allen, TX (US); David Patrick Dixon, Boerne, TX (US); Kevin Kenneth Fiedler, Fair Oaks Ranch, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 276 days.

(21) Appl. No.: 17/955,968

(22) Filed: Sep. 29, 2022

Related U.S. Application Data

(60) Provisional application No. 63/250,648, filed on Sep. 30, 2021.

(51) Int. Cl.
*G06Q 40/00* (2023.01)
*G06Q 10/10* (2023.01)
(Continued)

(52) U.S. Cl.
CPC .............. *G06Q 10/10* (2013.01); *G16Y 10/45* (2020.01); *G16Y 10/80* (2020.01); *G16Y 40/10* (2020.01)

(58) Field of Classification Search
CPC ........ G06Q 10/10; G16Y 10/45; G16Y 10/80; G16Y 40/10
(Continued)

(56) References Cited

U.S. PATENT DOCUMENTS 11,087,005 B2 * 8/2021 Cheng ................. H04L 63/0227
11,316,906 B1 * 4/2022 Prasad ................. H04L 41/5006
(Continued)

OTHER PUBLICATIONS

Research on Risk Assessment Method of Internet of Things Architecture Based on Parameter Joint Optimization; 2019 International Conference on Robots & Intelligent System (ICRIS) (2019, pp. 163-167); Pinggui Hu; Jun. 15, 2019. (Year: 2019).*
(Continued)

*Primary Examiner* — Tien C Nguyen
(74) *Attorney, Agent, or Firm* — Fletcher Yoder, P.C.

(57) ABSTRACT

A damage assessment system includes one or more processors and memory storing instructions executable by the one or more processors to cause the one or more processors to receive IOT data from one or more IOT devices at a property. The instructions are executable by the one or more processors to cause the one or more processors to analyze the IOT data to identify missing data that is expected to be received from the one or more IOT devices at the property, generate constructed data to remedy the missing data based on the IOT data using machine learning algorithms, determine characteristics of damage present at the property based on the IOT data and the constructed data, and output a damage assessment report to indicate the characteristics of the damage present at the property.

20 Claims, 2 Drawing Sheets

(51) Int. Cl.
*G16Y 10/45* (2020.01)
*G16Y 10/80* (2020.01)
*G16Y 40/10* (2020.01)

(58) Field of Classification Search
USPC ..... 705/4, 5, 3, 35, 40, 38, 39, 45; 709/226, 709/201, 227; 704/9; 701/425; 455/406; 715/753; 726/9, 6; 706/25, 45
See application file for complete search history.

(56) References Cited

U.S. PATENT DOCUMENTS

| | | | | |
|---|---|---|---|---|
| 11,451,571 | B2* | 9/2022 | Du | H04L 63/20 |
| 2014/0245165 | A1* | 8/2014 | Battcher | G06Q 40/08 |
| | | | | 715/738 |
| 2018/0336418 | A1* | 11/2018 | Splittstoesser | G06F 18/22 |
| 2020/0082168 | A1* | 3/2020 | Fathi | G06T 7/521 |
| 2021/0090240 | A1* | 3/2021 | Nei | G06T 7/0004 |
| 2021/0192629 | A1* | 6/2021 | Tofte | G06V 10/42 |
| 2021/0319518 | A1* | 10/2021 | Hall | G06Q 40/08 |
| 2021/0349799 | A1* | 11/2021 | Grant | H04L 67/12 |

OTHER PUBLICATIONS

Planning for Atmospheric Hazards and Disaster Management Under Changing Climate Conditions; 2006 IEEE EIC Climate Change Conference (pp. 1-9); H. Auld, D. MacIver, J. Klaassen, N. Comer, B. Tugwood; May 1, 2006. (Year: 2006).*

Data Processing Strategy in Internet of Things Application System; 2020 International Conference on Big Data & Artificial Intelligence & Software Engineering (ICBASE) (2020, pp. 86-89); Li Zhenhui; Oct. 30, 2020. (Year: 2020).*

* cited by examiner

DAMAGE ASSESSMENT SYSTEMS AND METHODS

CROSS-REFERENCE TO RELATED APPLICATION

The present application claims priority to and the benefit of U.S. Provisional Application No. 63/250,648, entitled "DAMAGE ASSESSMENT SYSTEMS AND METHODS" and filed on Sep. 30, 2021, the disclosure of which is incorporated by reference herein in its entirety for all purposes.

BACKGROUND

The present disclosure relates generally to damage assessment systems and methods. More specifically, the present disclosure relates to damage assessment systems and methods that obtain and analyze various types of data to assess damage levels of one or more properties in real-time (e.g., substantially real-time).

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Interconnected devices, which are sometimes referred to as Internet of Things (IOT) devices, are devices that include components (e.g., processor, sensor, and/or communication device) that enable the devices to exchange data over a network. For example, a user may have multiple interconnected devices, such as thermostats, smoke detectors, alarm systems, and the like, in their home.

SUMMARY

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In one embodiment, a damage assessment system includes one or more processors and memory storing instructions executable by the one or more processors to cause the one or more processors to receive IOT data from one or more IOT devices at a property. The instructions are executable by the one or more processors to cause the one or more processors to analyze the IOT data to identify missing data that is expected to be received from the one or more IOT devices at the property, generate constructed data to remedy the missing data based on the IOT data using machine learning algorithms, determine characteristics of damage present at the property based on the IOT data and the constructed data, and output a damage assessment report to indicate the characteristics of the damage present at the property.

In one embodiment, a method of operating a damage assessment system includes receiving, at one or more processors, IOT data from one or more IOT devices at a property. The method also includes analyzing, using the one or more processors, the IOT data to identify missing data that is expected to be received from the one or more IOT devices at the property. The method also includes generating, using the one or more processors, constructed data to remedy the missing data based on the IOT data using machine learning algorithms. The method also includes determining, using the one or more processors, characteristics of damage present at the property based on the IOT data and the constructed data. The method also includes outputting, using the one or more processors, a damage assessment report to indicate the characteristics of the damage present at the property.

In one embodiment, a non-transitory, computer-readable medium has instructions that when executed by one or more processors, cause the one or more processors to perform operations including receiving IOT data from one or more IOT devices at a property, analyzing the IOT data to identify missing data that is expected to be received from the one or more IOT devices at the property, and identifying relevant IOT devices of the one or more IOT devices, wherein the respective IOT data from the relevant IOT devices is expected to enable remedy of the missing data. The operations also include instructing adjustment of a sampling rate of the relevant IOT devices, processing the respective IOT data from the relevant IOT devices to generate constructed data to remedy the missing data using machine learning algorithms, determining occurrence of damage present at the property based on the IOT data and the constructed data, and providing an output indicative of the occurrence of the damage present at the property.

BRIEF DESCRIPTION OF THE DRAWINGS

Various aspects of this disclosure may be better understood upon reading the following detailed description and upon reference to the drawings in which.

DETAILED DESCRIPTION

Figure 1:
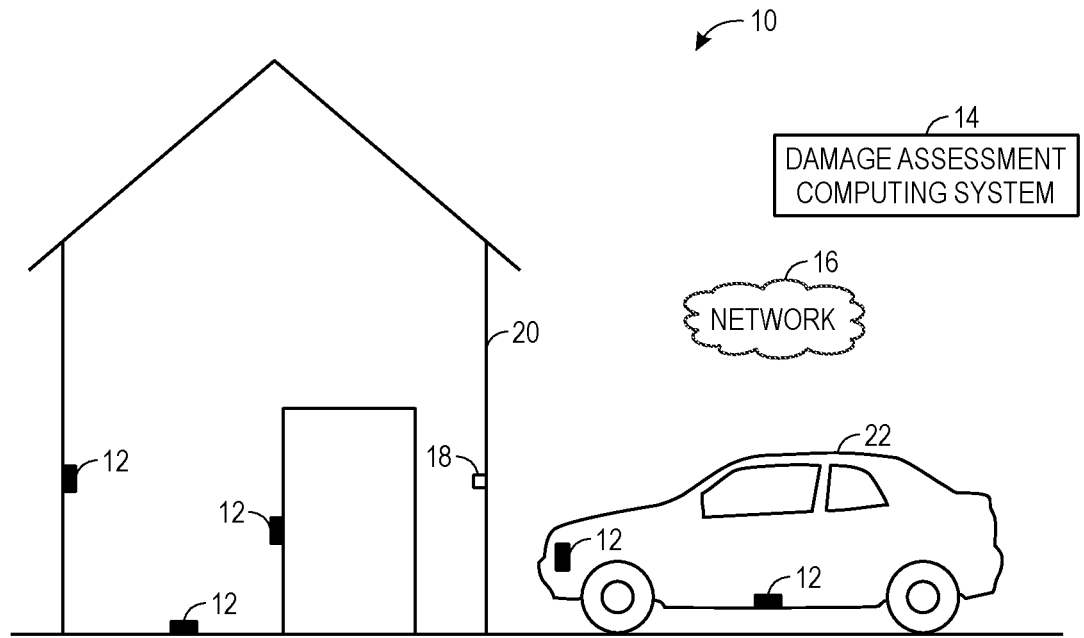
FIG. 1 is a schematic diagram of a damage assessment system that includes multiple IOT devices and a damage assessment computing system, in accordance with embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Interconnected devices, which are referred to herein as Internet of Things (IOT) devices, may be positioned at various locations (e.g., within buildings and/or vehicles).

The IOT devices include components (e.g., processor, sensor, and/or communication device) that enable the IOT devices to exchange data over a network. In particular, the IOT devices may collect various types of IOT reporting data and may provide the IOT reporting data to a computing system (e.g., a damage assessment computing system). For example, one IOT device may be a thermostat that collects and shares temperature data, and another IOT device may be a fluid level sensor that collects and shares fluid level data.

The IOT reporting data may indicate conditions of the IOT devices and/or conditions in an area surrounding the IOT devices. For example, the IOT reporting data from the thermostat may indicate that the thermostat within a building is set to 70 degrees, but that a temperature at the thermostat is 80 degrees. Thus, the IOT reporting data suggests that the thermostat or some other related device, such as an air conditioning unit, is not working properly. It is presently recognized that it may be beneficial to consider IOT reporting data from a set of multiple IOT devices to determine additional information and/or to more accurately assess the conditions of the IOT devices and/or the conditions in the area surrounding the IOT devices. For example, in addition to the IOT reporting data from the thermostat, the IOT reporting data from an alarm system may indicate that a window of the building is open. Thus, the IOT reporting data from the set of multiple IOT devices indicates that the thermostat and the air conditioning unit are likely working properly even in view of abnormal temperature readings.

In some cases, the IOT reporting data from the air conditioning unit is expected, but is not received. It may be desirable to solve for or to remedy the missing IOT reporting data from the air conditioning unit. The IOT reporting data from the alarm system assists with this process, as the IOT reporting data from the alarm system indicates that the IOT reporting data from the air conditioning unit, if received, should indicate that the air conditioning unit is working properly because the abnormal temperature readings are likely due to the window of the building being open. Accordingly, an output (e.g., damage assessment report) may be provided to a user to recommend that the user should check the window or close the window to address the abnormal temperature reading (instead of indicating that the user should check the air conditioning unit).

As discussed in more detail herein, a damage assessment system may include processing circuitry that processes the IOT reporting data from one or more IOT devices to determine conditions of the one or more IOT devices and/or conditions in the area surrounding the IOT devices. The damage assessment system may be configured to solve for or to remedy missing IOT reporting data based on known relationships between multiple IOT devices. The damage assessment system may use various algorithms, such as clustering algorithms and/or machine learning algorithms to remedy the missing IOT reporting data. The damage assessment system may generate constructed data (e.g., fill-in data; replacement data) to remedy the missing IOT reporting data. Thus, the constructed data may be computer-generated data that replaces or is processed in place of the missing IOT reporting data.

Additionally, the damage assessment system may receive external data (e.g., image data) from one or more external sources (e.g., cameras, one or more databases). The damage assessment system may also access historical data (e.g., empirical and/or modeled data) from one or more databases. The damage assessment system may create an overlay of the IOT reporting data and the external data. The damage assessment system may utilize the overlay and/or the historical data to remedy the missing IOT reporting data. For example, the historical data may be used to generate algorithms that are used to remedy the missing IOT reporting data and/or the historical data may be used to generate templates that may be matched to the overlay and/or the IOT reporting data to remedy the missing IOT reporting data.

Additionally or alternatively, the damage assessment system may utilize the overlay and/or the historical data to calculate a damage level (e.g., severity) and/or other characteristics of damage. For example, the overlay may be used in conjunction with templates that are based on the historical data to determine the damage level of the damage. The damage assessment system may also determine a type of the damage, as well as part(s) to address the damage. In such cases, the damage assessment system may send a request to a supplier to request the part(s) and/or costs associated with the part(s). The damage assessment system may assist users in reducing damage to their property (e.g., buildings, vehicles), such as by efficiently detecting the damage, accurately determining the characteristics of the damage, ordering part(s) to address the damage, and/or providing the output with one or more recommendations to address the damage. In turn, this may assist an insurance company that insures the property by reducing claims and/or monetary amounts of payouts for the claims. In some cases, the insurance company may provide an incentive to the users, such as a reduced insurance cost (e.g., premium and/or deductible), in response to the users setting up the IOT devices to send the IOT reporting data to the damage assessment system.

With the foregoing in mind, FIG. 1 is a schematic diagram of a damage assessment system 10 that includes multiple IOT devices 12 and a damage assessment computing system 14, in accordance with embodiments of the present disclosure. The multiple IOT devices 12 are configured to provide IOT reporting data to the damage assessment computing system 14 via a network 16 (e.g., Internet, Bluetooth, 5G). It should be appreciated that the multiple IOT devices 12 may provide the IOT reporting data to the damage assessment computing system 14 directly or indirectly through an intermediate hub 18 (e.g., data-collection hub; hub device). As shown, the multiple IOT devices 12 and the intermediate hub 18 (when present) may be located at one or more properties, such as at a building 20 (e.g., residential or commercial building) and/or a vehicle 22.

The damage assessment computing system 14 may analyze the IOT reporting data to determine conditions of the multiple IOT devices 12 and/or conditions of the one or more properties (e.g., perform a damage assessment). The damage assessment computing system 14 may access and/or store information related to the multiple IOT devices 12 at the one or more properties. The information may include a number of the multiple IOT devices 12, a location of each of the multiple IOT devices 12 (e.g., relative location and/or absolute location, such as based on global positioning system coordinates), a type of data collected by each of the multiple IOT devices 12, known or expected relationships between the multiple IOT devices 12, and/or any other relevant parameter. The damage assessment computing system 14 may also consider the multiple IOT devices 12 as a set and may utilize the information to perform the damage assessment. For example, the damage assessment computing system 14 may utilize the known or expected relationships between the multiple IOT devices 12 to account for or to remedy missing IOT reporting data. In this way, the damage assessment computing system 14 may perform the damage assessment even if the damage assessment computing system 14 does not receive complete (or any) IOT reporting data from one or more of the multiple IOT devices 12.

As a more specific example, the multiple IOT devices 12 may indicate that fluid is pooled on a kitchen floor of the building 20. The multiple IOT devices 12 may also indicate a refrigerator is working properly; however, the multiple IOT devices 12 may not provide any data directly related to a dishwasher (e.g., one of the multiple IOT devices 12 associated with or integrated into the dishwasher did not provide any data). In this case, even though the damage assessment computing system 14 does not receive any data directly related to the dishwasher, the damage assessment computing system 14 may consider the known or expected relationships and determine that the IOT reporting data, if received, would indicate failure of the dishwasher. Then, the damage assessment computing system 14 may determine that the fluid is due to the failure of the dishwasher. In this way, the damage assessment computing system 14 may be considered to remedy missing data to perform the damage assessment.

It should be appreciated that the damage assessment computing system 14 may remedy missing data to perform the damage assessment in more complex situations and with more complex sets of IOT reporting data. For example, the multiple IOT devices 12 may indicate that a level of a brake fluid is low in the vehicle 22 and that tire pressure is low in a tire of the vehicle 22; however, the multiple IOT devices 12 may not provide any data directly related to a level of an engine coolant (e.g., one of the multiple IOT devices 12 associated with or integrated into a respective receptacle for the engine coolant did not provide any data and/or there is no IOT device 12 associated with or integrated into the respective receptacle for the engine coolant). In this case, even though the damage assessment computing system 14 does not receive any data directly related to the level of the engine coolant, the damage assessment computing system 14 may determine that the respective receptacle for the engine coolant is likely to be damaged because it is positioned between a respective receptacle for the brake fluid and the tire. Additionally, the damage assessment computing system 14 may determine that a fender, a side panel, and/or a hood of the vehicle 22 is likely to be damaged because it is positioned over the respective receptacle for the brake fluid, as well as over the tire. In this way, the damage assessment computing system 14 may perform the damage assessment on portions of the property (e.g., the vehicle 22) that are not directly monitored via the multiple IOT devices 12.

It should also be appreciated that the IOT reporting data from multiple IOT devices 12 across multiple properties (e.g., both the building 20 and the vehicle 22) may be evaluated together. For example, the multiple IOT devices 12 may indicate that fluid is pooled on the kitchen floor, a bathroom floor, and a laundry room floor on a first story of the building 20. The multiple IOT devices 12 may also indicate that no fluid is pooled on a bathroom floor on a second story of the building 20. The multiple IOT devices 12 may also indicate that appliances on a second story of the building 20 are working properly; however, the multiple IOT devices 12 may not provide any data directly related to appliances on a first story of the building 20 or any data directly related to the vehicle 22 (e.g., one of the multiple IOT devices 12 associated with or integrated into the appliance or the vehicle 22 did not provide any data). The multiple IOT devices 12 may have previously provided IOT reporting data that indicates that the vehicle 22 is present in a garage adjacent to the building 20. The damage assessment computing system 14 may determine that the building 20 and the vehicle 22 are flooded (e.g., due to a natural disaster) to an extent that has rendered the multiple IOT devices 12 for the appliances on the first floor and/or for the vehicle 22 to be inoperable.

In some embodiments, one of the IOT devices 12 may detect an abnormal reading (e.g., a parameter that meets or exceeds a threshold) and send the IOT reporting data indicative of the abnormal reading to the damage assessment computing system 14. In response, the damage assessment computing system 14 may request and/or analyze IOT reporting data from one or more other IOT devices 12, such as all of the other IOT devices 12 at the one or more properties or certain IOT devices 12 at the one or more properties (e.g., nearby IOT devices 12; selected based on the known or expected relationships). In some embodiments, the IOT devices 12 may continuously and/or periodically send the IOT reporting data to the damage assessment computing system 14, which may then continuously and/or periodically perform the damage assessment.

The damage assessment computing system 14 may employ clustering algorithms to evaluate the IOT reporting data from clusters of the multiple IOT devices 12 to perform the damage assessment. The damage assessment computing system 14 may employ machine learning algorithms to remedy the missing data to perform the damage assessment. As used herein, machine learning refers to algorithms and statistical models that may be used to perform a specific task without using explicit instructions, relying instead on patterns and inference. In particular, machine learning generates a mathematical model based on data (e.g., sample or training data, historical data) in order to make predictions or decisions without being explicitly programmed to perform the task. Thus, patterns may be referred to (e.g., a current pattern of IOT reporting data) for accurately determining the conditions of the multiple IOT devices 12 and/or surrounding areas of the one or more properties.

As discussed in more detail herein, the damage assessment computing system 14 may also receive external data (e.g., image data) from one or more external data sources (e.g., cameras; one or more databases) and/or historical data (e.g., prior data, such as empirical and/or modeled data). The damage assessment computing system 14 may overlay the external data and the IOT reporting data, which may provide additional information to corroborate and/or to remedy the IOT reporting data. Furthermore, the damage assessment computing system 14 may access the historical data, which may be used to generate algorithms and/or templates that indicate types of damage that occur together and/or types of damage that accompany certain sets of IOT reporting data and/or external data.

With reference to one of the above-noted examples, the historical data may indicate the fluid being pooled on the kitchen floor in combination with the refrigerator in the kitchen working properly and no data directly related to the dishwasher in the kitchen likely corresponds to failure of the dishwasher. With reference to another one of the above-noted examples, the external data may indicate that a front right side of the vehicle 22 is bent and that the tire is flat. The external data may be overlaid or processed together with the IOT reporting data that indicates that the respective level of the brake fluid is low and that the tire pressure of the tire is low, and the damage assessment computing system 14 may determine that the external data and the IOT reporting data correspond or corroborate one another. Additionally, the historical data may indicate that the IOT reporting data and the external data corresponds to damage to the respective receptacle for the engine coolant. In this way, the damage assessment computing system 14 may perform real-time (e.g., substantially real-time) damage assessment using IOT reporting data, including analysis and/or remedy of absent or omitted IOT reporting data (e.g., expected IOT reporting data is not received).

Advantageously, the damage assessment computing system 14 may only request or access the external data and/or the historical data in response to indications that certain IOT reporting data is missing and/or that certain IOT reporting data indicates damage. Further, the damage assessment computing system 14 may only request or access specific, relevant types of the external data and/or the historical data (e.g., subsets of the external data and/or the historical data) based on the indications that certain IOT reporting data is missing and/or that certain IOT reporting data indicates damage (e.g., based on the type of the IOT reporting data that is missing and/or characteristics of the damage, such as a type and/or a location of the damage). Further, the damage assessment computing system 14 may dynamically adjust a sample rate of the multiple IOT devices 12. For example, the damage assessment computing system 14 may determine that certain IOT reporting data will be helpful to remedy the missing IOT reporting data and/or to identify the damage. The damage assessment computing system 14 may determine that the certain IOT reporting data will be helpful based on the missing IOT reporting data, suspected characteristics of the damage based on the available IOT reporting data, proximity to the IOT device with the missing IOT reporting data (e.g., in a same room of the building 20; in a same property), and so forth. Then, in response, the damage assessment computing system 14 may increase the sampling rate of the certain IOT devices 12 (e.g., relevant IOT devices 12) that obtain the certain IOT reporting data that will be helpful (e.g., from a first sampling rate, such as one reading per time period, to a second sampling rate, such as multiple readings per time period). Then, once the damage assessment computing system 14 completes the remedy of the missing IOT reporting data and/or generates the damage assessment report, the damage assessment computing system 14 may decrease the sampling rate of the certain IOT devices 12 (e.g., to return to the first sampling rate).

Figure 2:
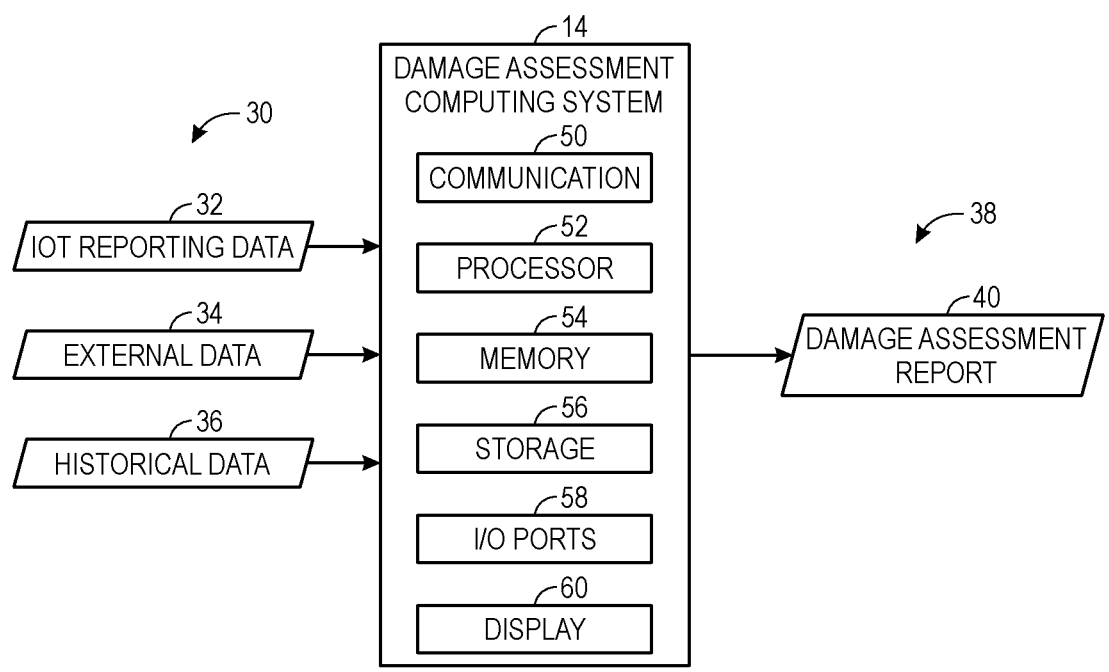
FIG. 2 is a block diagram of the damage assessment computing system of FIG. 1, in accordance with embodiments of the present disclosure.

FIG. 2 is a block diagram of the damage assessment computing system 14, in accordance with embodiments of the present disclosure. As shown, the damage assessment computing system 14 is configured to receive various inputs 30, such as the IOT reporting data 32 from the multiple IOT devices 12, the external data 34 (e.g., image data) from the external data sources (e.g., cameras, the one or more databases), and/or the historical data 36 (e.g., prior data, such as empirical and/or modeled data). The damage assessment computing system 14 is configured to process the various inputs 30 and to generate one or more outputs 38, such as a damage assessment report 40. The damage assessment report 40 may provide information about the damage, such as an indication of a presence the damage, characteristics (e.g., type, level, cause) of the damage, and/or a recommended step to address the damage (e.g., to turn off an appliance or a water supply; a list of suppliers to contact). The damage assessment report 40 may provide information about the IOT reporting data 32, the external data 34, and/or the historical data 36. The damage assessment report 40 may provide information about the damage assessment, such as certain IOT reporting data 32 that was unexpectedly missing or incomplete and/or external data 34 that includes images of the property with or without the IOT reporting data 32 overlaid onto the images of the property.

The damage assessment computing system 14 may include certain components to facilitate the disclosed techniques. For example, the damage assessment computing system 14 may include a communication component 50, a processor 52, a memory 54, a storage 56, input/output (I/O) ports 58, and/or an output device 60 (e.g., a display or a speaker). The communication component 50 may be a wireless or wired communication component that may facilitate communication with the IOT devices 12, the external data sources, the databases, and/or separate devices (e.g., a mobile phone or tablet). The memory 54 stores code executable by the processor 52 to perform operations and method steps in accordance with the present embodiments.

The processor 52 may be any suitable type of computer processor or microprocessor capable of executing computer-executable code. The processor 52 may also include multiple processors that may perform the operations described herein. The memory 54 and the storage 56 may be any suitable articles of manufacture that can serve as media to store processor-executable code, data, or the like. These articles of manufacture may represent non-transitory computer-readable media (e.g., any suitable form of memory or storage) that may store the processor-executable code used by the processor 52 to perform the presently disclosed techniques. The memory 54 and the storage 56 may also be used to store the data, various other software applications, and the like. It should be noted that non-transitory merely indicates that the media is tangible and not a signal.

The I/O ports 58 may be interfaces that may couple to other peripheral components such as input devices (e.g., keyboard, mouse), sensors, input/output (I/O) modules, and the like. The output device 60 may operate to depict indications associated with software or executable code processed by the processor 52. For example, the output devices 60 may be a display screen that provides the damage assessment report 40, such as a text message with information about the damage. In one embodiment, the output device 60 may be an input device. For example, the output device 60 may include a touch display capable of receiving inputs from a user of the damage assessment computing system 14. The output device 60 may be any suitable type of display, such as a liquid crystal display (LCD), plasma display, or an organic light emitting diode (OLED) display, for example. It should be noted that the components described above with regard to the damage assessment computing system 14 are exemplary components and the damage assessment computing system 14 may include additional or fewer components. Furthermore, the damage assessment computing system 14 may communicate with one or more other devices, such as the intermediate hub 18 and/or a user device (e.g., mobile phone of the user), to provide the damage assessment report 40 via the one or more other devices.

Figure 3:
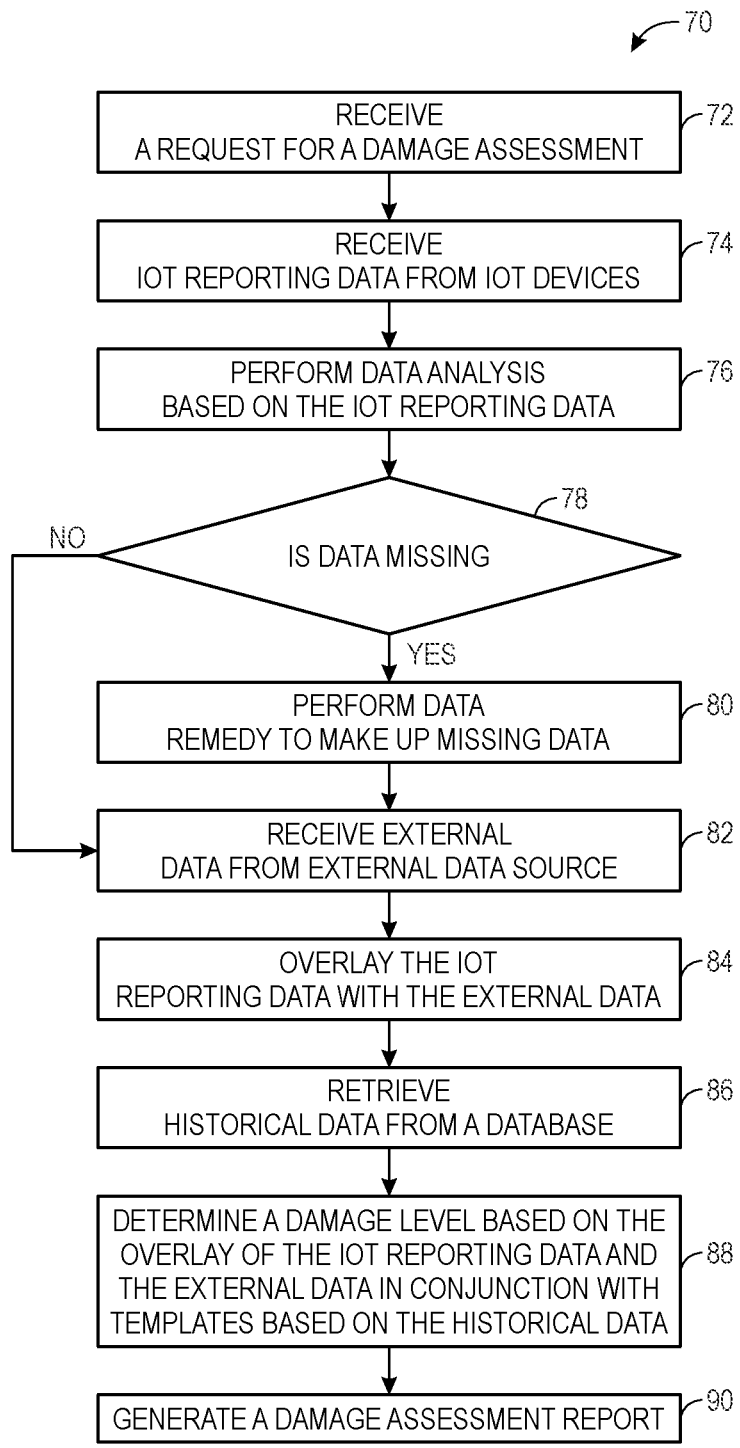
FIG. 3 is a flow diagram of a method of operating the damage assessment system of FIG. 1, in accordance with embodiments of the present disclosure.

FIG. 3 is a flow diagram of a method 70 of operating the damage assessment system of FIG. 1, in accordance with embodiments of the present disclosure. The following description of the method 70 will be described as being performed by the damage assessment computing system 14, but it should be noted that any suitable processor-based device may be specially programmed to perform any of the steps of the methods described herein. Moreover, although the following description of the method 70 is described in a particular order, it should be understood that the steps of the method 70 may be performed in any suitable order, certain steps of the method 70 may be omitted, and/or other steps may be added to the method 70.

In block 72, the damage assessment computing system 14 may receive a request for a damage assessment. The request may be input by the user, such as via the intermediate hub 18 and/or the user device. The request may also be effectively input by the IOT reporting data from the IOT devices 12, such upon receipt and/or identification of any abnormal readings by the IOT devices 12. For example, in response to detection of fluid pooled on the kitchen floor or tire pressure below a threshold, the IOT devices 12 may provide the request and/or the IOT reporting data to the damage assessment computing system 14 to thereby initiate the damage assessment. As another example, the damage assessment computing system 14 may periodically and/or continuously receive the IOT reporting data from the IOT devices 12. In some such cases, the damage assessment computing system 14 may periodically and/or continuously perform the damage assessment. In other such cases, the damage assessment computing system 14 may initiate the damage assessment in response to identifying abnormal readings in the IOT reporting data from the IOT devices 12.

In block 74, the damage assessment computing system 14 may receive the IOT reporting data from the IOT devices 12. In some cases, the damage assessment computing system 14 may have at least some initial IOT reporting data from the IOT devices 12, and the damage assessment computing system 14 may request additional IOT reporting data from the IOT devices 12 and/or from other IOT devices 12 (e.g., other IOT devices 12 that are likely to be relevant based on the expected or known relationships).

In block 76, the damage assessment computing system 14 may perform data analysis based on the IOT reporting data from the IOT devices 12. In some embodiments, the damage assessment computing system 14 may analyze the IOT reporting data by accessing information (e.g., from one or more databases) about the IOT devices 12 associated with the property. For example, the damage assessment computing system 14 may access the information about the number of IOT devices 12 at the property, expected IOT reporting data from the IOT devices 12 at the property, and the like.

In block 78, the damage assessment computing system 14 may determine whether any IOT reporting data is missing (e.g., the IOT reporting data received at the damage assessment computing system 14 is incomplete or does not correspond to what is expected based on the information known about the IOT reporting devices 12 at the property). If any IOT reporting data is missing, the method 70 proceeds to block 80. In block 80, the damage assessment computing system 14 performs data remedy to make up (e.g., solve for or remedy) the missing data. In some embodiments, the damage assessment computing system 14 utilizes clustering algorithms for efficient analysis and fit to make up the missing data. In some embodiments, the damage assessment computing system 14 utilizes machine learning algorithms for efficient analysis to make up the missing data. For example, the IOT reporting data from a cluster of IOT devices 12 in the kitchen may be analyzed together to solve for and to remedy the IOT reporting data that is missing from one IOT device in the kitchen (e.g., the dishwasher), or the IOT reporting data from a cluster of IOT devices 12 in a front portion of the vehicle 22 may be analyzed together to solve for and to remedy the IOT reporting data that is missing from one IOT device (e.g., at the receptacle for the engine coolant). Similarly, the IOT reporting data from the IOT devices 12 in the kitchen may be input into the machine learning algorithms to solve for and the remedy the IOT reporting data that is missing from one IOT device in the kitchen (e.g., the dishwasher), and so on. The damage assessment computing system 14 may generate constructed data (e.g., fill-in data; replacement data) remedy the missing IOT reporting data. Thus, the constructed data may be computer-generated data that replaces or is processed as the missing IOT reporting data. If no IOT reporting data is missing, the damage assessment computing system 14 proceed to block 82 without performing the data remedy in block 80.

In block 82, the damage assessment computing system 14 may receive the external data from the external data sources. The external data may be images of the property, such as floorplans, maps, still images, and/or moving images. The external data may be images captured by one or more cameras, such as one or more cameras operated by the user, positioned at the property, and/or mounted on a vehicle (e.g., drone, remotely-controlled or autonomously controlled vehicle, aerial vehicle, and/or land-based vehicle) that is separate from the property. The one or more cameras may be operated to obtain the images during a setup process prior to the damage assessment and/or during the damage assessment. The images may provide information about the relative locations of the IOT devices 12, features of the property, and/or damage (if captured after occurrence of the damage and/or during the damage assessment). The external data may be stored in the one or more databases, and the damage assessment computing system 14 may retrieve the external data from the one or more databases in block 82.

In block 84, the damage assessment computing system 14 may overlay the IOT reporting data from the IOT devices 12 with the external data. In this way, the damage assessment computing system 14 may use the external data to corroborate the IOT reporting data and/or to assist with the damage assessment. It should be appreciated that in some embodiments, the damage assessment computing system 14 may utilize the external data and the overlay to assist with the data remedy in block 82.

In block 86, the damage assessment computing system 14 may receive historical data from the one or more databases. The historical data may be prior data, such as empirical data and/or modeled data. The historical data may relate to prior IOT reporting data collected by various IOT devices (e.g., the IOT devices 12 at the property and/or other IOT devices at other properties), as well as prior external data and/or prior damage outcomes (e.g., characteristics of damage). The historical data may be used to generate algorithms and/or templates that relate the prior IOT reporting data and/or the prior external data (or overlays thereof) to the prior damage outcomes.

In block 88, the damage assessment computing system 14 may determine a damage level based on the overlay of the IOT reporting data and the external data in conjunction with the algorithms and/or templates that are based on the historical data. For example, the damage assessment computing system 14 may compare the overlay of the IOT reporting data that shows the brake fluid is low and the tire pressure is low and the external data that shows the side panel is bent with the templates that are based on the historical data. Upon finding a match between the overlay and one of the templates, the damage assessment computing system 14 may determine the damage level and/or other damage characteristics based on the prior damage outcome associated with the one of the templates. For example, the damage level may include severe damage to a frame of the vehicle because this is one of the prior damage outcomes associated with the one of the templates.

In block 90, the damage assessment computing system 14 may generate an output, such as a damage assessment report.

The damage assessment report may be provided via the output device 60 (e.g., display) of the damage assessment computing system 14 or via any other suitable device (e.g., via respective displays of the intermediate hub 18 and/or the user device). As noted herein, the damage assessment report may provide any of a variety of information, such as information about the damage, including an indication of a presence the damage, characteristics (e.g., type, level, cause) of the damage, and/or a recommended step to address the damage (e.g., to turn off an appliance or a water supply; a list of suppliers to contact). The damage assessment report may provide information about the IOT reporting data 32, the external data, and/or the historical data 36. The damage assessment report 40 may provide information about the damage assessment, such as certain IOT reporting data 32 that was unexpectedly missing or incomplete and/or external data that includes images of the property with or without the IOT reporting data 32 overlaid onto the images of the property.

The damage assessment computing system 14 may also determine part(s) to address the damage. In such cases, the output and/or the damage assessment report may include a request to a supplier to request the part(s) and/or an estimate of costs associated with the part(s). For example, the damage assessment report may be sent to a supplier computing device that is located remotely from the property. The output may include other steps, such as control signals to control certain part(s) (e.g., to shut off valves to stop fluid leaks, to control an autonomous controller of the vehicle 22 to park the vehicle 22). The damage assessment computing system 14 may also be configured to cross-check prior damage assessments for the property with a current damage assessment for the property. For example, the prior damage for the property may be compared to the current damage for the property to eliminate double insurance payout (e.g., in cases in which a prior insurance payout was provided to repair the prior damage, but the prior damage was not repaired). Indeed, the damage assessment system may assist users in reducing damage to their property (e.g., buildings, vehicles) and may assist an insurance company that insures the property by reducing claims and/or monetary amounts of payouts for the claims.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A damage assessment system, comprising:
   one or more processors; and
   memory storing instructions executable by the one or more processors to cause the one or more processors to:
   receive a first set of internet of things (IOT) data from one or more IOT devices corresponding to one or more locations at a property, wherein the first set of IOT data comprises respective data obtained at a first sampling rate via a first IOT device of the one or more IOT devices at a first location of the one or more locations;
   analyze the first set of IOT data to identify missing data that is expected to be received from a second IOT device of the one or more IOT devices at a second location of the property one or more locations;
   in response to identifying the missing data:
      determine that the first IOT device is relevant to the missing data based on the first location being within a threshold proximity of the second location;
      increase the first sampling rate for the first IOT device to a second sampling rate for the first IOT device;
      receive a second set of IOT data from at least the first IOT device, wherein the second set of IOT data comprises respective data obtained at the second sampling rate via the first IOT device;
      input at least the respective IOT data obtained at the second sampling rate via the first IOT device to one or more machine learning algorithms to generate constructed data in place of the missing data;
      determine characteristics of damage present at the property based on the first set of IOT data, the second set of IOT data, and the constructed data; and
      output a damage assessment report to indicate the characteristics of the damage present at the property.

2. The damage assessment system of claim 1, wherein the instructions are executable by the one or more processors to cause the one or more processors to:
   receive one or more images of the property; and
   determine the characteristics of the damage present at the property based on the first set of IOT data, the second set of IOT data, the constructed data, and the one or more images.

3. The damage assessment system of claim 1, wherein the instructions are executable by the one or more processors to cause the one or more processors to:
   receive historical data that relates prior IOT data to prior damage characteristics; and
   use the historical data as training data for the machine learning algorithms.

4. The damage assessment system of claim 1, wherein the instructions are executable by the one or more processors to cause the one or more processors to:
   access a plurality of templates that relate prior IOT data to prior damage characteristics;
   compare the plurality of templates to the first set of IOT data, the second set of IOT data, and the constructed data to identify a matching template of the plurality of templates; and
   determine the characteristics of the damage present at the property based on respective prior damage characteristics associated with the matching template of the plurality of templates.

5. The damage assessment system of claim 1, wherein the instructions are executable by the one or more processors to cause the one or more processors to:
receive one or more images of the property;
access a plurality of templates that relate prior IOT data and prior images to prior damage characteristics;
compare the plurality of templates to the first set of IOT data, the second set of IOT data, the constructed data, and the one or more images to identify a matching template of the plurality of templates; and
determine the characteristics of the damage present at the property based on respective prior damage characteristics associated with the matching template of the plurality of templates.

6. The damage assessment system of claim 1, wherein the instructions are executable by the one or more processors to cause the one or more processors to output the damage assessment report via a hub device located at the property.

7. The damage assessment system of claim 1, wherein the instructions are executable by the one or more processors to cause the one or more processors to output the damage assessment report to a supplier computing device located remotely from the property.

8. The damage assessment system of claim 1, comprising the one or more IOT devices.

9. A method of operating a damage assessment system, the method comprising:
receiving, at one or more processors, a first set of internet of things (IOT) data from one or more IOT devices corresponding to one or more locations at a property, wherein the first set of IOT data comprises respective IOT data obtained at a first sampling rate via a first IOT device of the one or more IOT devices at a first location of the one or more locations;
analyzing, using the one or more processors, the first set of IOT data to identify missing data that is expected to be received from a second IOT device of the one or more IOT devices at a second location of the property one or more locations;
in response to identifying the missing data:
determining that the first IOT device is relevant to the missing data based on the first location being within a threshold proximity of the second location;
increasing the first sampling rate for the first IOT device to a second sampling rate for the first IOT device;
receiving a second set of IOT data from at least the first IOT device, wherein the second set of IOT data comprises respective data obtained at the second sampling rate via the first IOT device;
inputting at least the respective IOT data obtained at the second sampling rate via the first IOT device to one or more machine learning algorithms to generate constructed data in place of the missing data;
determining, using the one or more processors, characteristics of damage present at the property based on the first set of IOT data, the second set of IOT data, and the constructed data; and
outputting, using the one or more processors, a damage assessment report to indicate the characteristics of the damage present at the property.

10. The method of claim 9, comprising:
receiving, at the one or more processors, one or more images of the property; and
determining, using the one or more processors, the characteristics of the damage present at the property based on the first set of IOT data, the second set of IOT data, the constructed data, and the one or more images.

11. The method of claim 9, comprising:
receiving, at the one or more processors, historical data that relates prior IOT data to prior damage characteristics; and
using, the one or more processors, the historical data as training data for the machine learning algorithms.

12. The method of claim 9, comprising:
accessing, using the one or more processors, a plurality of templates that relate prior IOT data to prior damage characteristics;
comparing, using the one or more processors, the plurality of templates to the first set of IOT data, the second set of IOT data, and the constructed data to identify a matching template of the plurality of templates; and
determining, using the one or more processors, the characteristics of the damage present at the property based on respective prior damage characteristics associated with the matching template of the plurality of templates.

13. The method of claim 9, comprising:
receiving, at the one or more processors, one or more images of the property;
accessing, using the one or more processors, a plurality of templates that relate prior IOT data and prior images to prior damage characteristics;
comparing, using the one or more processors, the plurality of templates to the first set of IOT data, the second set of IOT data, the constructed data, and the one or more images to identify a matching template of the plurality of templates; and
determining, using the one or more processors, the characteristics of the damage present at the property based on respective prior damage characteristics associated with the matching template of the plurality of templates.

14. The method of claim 9, comprising instructing, using the one or more processors, output of the damage assessment report via a hub device located at the property.

15. The method of claim 9, comprising instructing, using the one or more processors, output of the damage assessment report to a supplier computing device located remotely from the property.

16. A non-transitory, computer-readable medium, comprising instructions that when executed by one or more processors, cause the one or more processors to perform operations comprising:
receiving a first set of internet of things (IOT) data from one or more IOT devices corresponding to one or more locations at a property, wherein the first set of IOT data comprises respective IOT data obtained at a first sampling rate via a first IOT device of the one or more IOT devices at a first location of the one or more locations;
analyzing the first set of IOT data to identify missing data that is expected to be received from a second IOT device of the one or more IOT devices at a second location of the property one or more locations;
in response to identifying the missing data:
identifying the first IOT device as a relevant IOT device of the one or more IOT devices based on the first location being within a threshold proximity of the second location, wherein the respective IOT data from the first IOT device is expected to enable remedy of the missing data;

instructing adjustment of the first sampling rate of the first IOT device to change a quantity of data acquired per period of time by the first IOT device;

receiving a second set of IOT data from at least the first IOT device, wherein the second set of IOT data comprises respective IOT data obtained at the second sampling rate via the first IOT device;

inputting at least the respective IOT data obtained at the second sampling rate via the first IOT device to one or more machine learning algorithms to generate constructed data in place of the missing data;

determining occurrence of damage present at the property based on the first set of IOT data, the second set of IOT data, and the constructed data; and providing an output indicative of the occurrence of the damage present at the property.

17. The non-transitory, computer-readable medium of claim 16, wherein instructing the adjustment of the sampling rate of the first IOT device comprises increasing the sampling rate of the first IOT device.

18. The non-transitory, computer-readable medium of claim 16, wherein the operations comprise:
   receiving one or more images of the property; and
   determining the occurrence of the damage present at the property based on the first set of IOT data, the second set of IOT data, the constructed data, and the one or more images.

19. The system of claim 1, wherein the instructions are executable by the one or more processors to cause the one or more processors to return the first IOT device to operate at the first sampling rate after outputting the damage assessment report.

20. The method of claim 9, comprising returning, using the one or more processors, the first IOT device to the first sampling rate after outputting the damage assessment report.

* * * * *